(12) United States Patent
Yi et al.

(10) Patent No.: US 12,073,949 B2
(45) Date of Patent: Aug. 27, 2024

(54) HEAT TRANSFERRING DEVICE WITH A WORKING FLUID IN A CLOSED LOOP UTILIZING GRAVITY AND PRESSURE

(71) Applicant: KOREA ATOMIC ENERGY RESEARCH INSTITUTE, Daejeon (KR)

(72) Inventors: Sung-Jae Yi, Daejeon (KR); Sung Uk Ryu, Daejeon (KR); Hyun Sik Park, Daejeon (KR); Ki Yong Choi, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 60 days.

(21) Appl. No.: 17/054,910

(22) PCT Filed: Nov. 29, 2018

(86) PCT No.: PCT/KR2018/014905
§ 371 (c)(1),
(2) Date: Nov. 12, 2020

(87) PCT Pub. No.: WO2019/221351
PCT Pub. Date: Nov. 21, 2019

(65) Prior Publication Data
US 2021/0225535 A1 Jul. 22, 2021

(30) Foreign Application Priority Data
May 15, 2018 (KR) .......................... 10-2018-0055375

(51) Int. Cl.
*G21C 15/24* (2006.01)
*F28D 15/02* (2006.01)

(52) U.S. Cl.
CPC .......... *G21C 15/24* (2013.01); *F28D 15/0266* (2013.01)

(58) Field of Classification Search
CPC ....... G21C 15/24; G21C 15/243; G21C 15/26; F28D 15/0216; F28D 15/025
(Continued)

(56) References Cited

U.S. PATENT DOCUMENTS 2,973,715 A * 3/1961 MacCracken ............ G21D 1/04
376/241
3,258,925 A * 7/1966 Jo ............................ F25B 9/004
376/904
(Continued)

FOREIGN PATENT DOCUMENTS

EP 3316264 A1 5/2018
JP 2004101492 A 4/2004
(Continued)

OTHER PUBLICATIONS

Extended European Search Report dated Dec. 22, 2021 issued in the corresponding European Patent Application No. 18919079.6.

*Primary Examiner* — Jack W Keith
*Assistant Examiner* — Jinney Kil
(74) *Attorney, Agent, or Firm* — Harness, Dickey & Pierce, P.L.C.

(57) ABSTRACT

A heat transferring device including a heater, a cooler, and a recoverer may be provided. The heater may be configured to heat a first liquid working fluid and change the first liquid working fluid to a gaseous working fluid. The cooler may be configured to cool the gaseous working fluid supplied from the heater and change the gaseous working fluid supplied from the heater to a second liquid working fluid. The recoverer may be configured to enable the second liquid working fluid from the cooler to move to the heater. Accordingly, the second liquid working fluid of the cooler may be (Continued)

movable in an upward direction and then recoverable using gravity, without a separate power source.

7 Claims, 5 Drawing Sheets

(58) Field of Classification Search
USPC .................................. 376/361, 366, 370, 402
See application file for complete search history.

(56) References Cited

U.S. PATENT DOCUMENTS

| | | | | |
|---|---|---|---|---|
| 3,554,869 | A | * | 1/1971 | Dickson ................. G21C 15/28 376/370 |
| 4,051,892 | A | * | 10/1977 | Reinsch ................. G21C 15/18 165/104.27 |
| 5,102,617 | A | * | 4/1992 | Gluntz ................... G21C 15/18 376/283 |
| 2004/0028171 | A1 | * | 2/2004 | Nicholls ................ G21C 19/07 376/361 |
| 2009/0314472 | A1 | | 12/2009 | Kim et al. |
| 2010/0071880 | A1 | | 3/2010 | Kim et al. |
| 2011/0051877 | A1 | * | 3/2011 | Ahlfeld .................. G21C 3/041 376/361 |
| 2015/0077938 | A1 | | 3/2015 | Espersen |
| 2016/0329114 | A1 | | 11/2016 | Lin-Hendel |
| 2018/0358137 | A1 | * | 12/2018 | Iino ....................... F15D 1/0015 |

FOREIGN PATENT DOCUMENTS

| | | | | | |
|---|---|---|---|---|---|
| JP | | 2010169283 | A | * | 8/2010 |
| JP | | 2014-212293 | A | | 11/2014 |
| JP | | 2017067355 | A | * | 4/2017 |
| KR | | 101374751 | B1 | | 3/2014 |
| KR | | 101617161 | B1 | | 5/2016 |
| KR | 10-2020-0004319 | A | | | 1/2020 |
| KR | 10-2002-0004319 | A | | | 1/2022 |
| WO | WO-2013081148 | A1 | * | 6/2013 | .............. F22B 1/023 |
| WO | WO-2017/170153 | A1 | | 10/2017 | |

* cited by examiner

HEAT TRANSFERRING DEVICE WITH A WORKING FLUID IN A CLOSED LOOP UTILIZING GRAVITY AND PRESSURE

CROSS-REFERENCE TO RELATED APPLICATIONS

This application is a national stage entry of International Application No. PCT/KR2018/014905, filed on Nov. 29, 2018, which claims the benefit of Korean Application No. 10-2018-0055375, filed on May 15, 2018, both of which of are incorporated by reference herein.

TECHNICAL FIELD

The present invention relates to a heat transferring device having a pumping structure, and more specifically, to a heat transferring device having a pumping structure, in which a working fluid of a cooling part is movable in an upward direction without a separate power source, and which can use gravity while recovering the working fluid and apply various heat sources to a heating part.

BACKGROUND

Generally, various heat transferring devices are used to transfer heat in a high temperature part to a low temperature part, a heat pipe, which is one of the heat transferring devices, accommodates a working fluid in a pipe made of a conductive material, the working fluid is evaporated in a gas state when heat introduced from the outside is supplied to one side of the pipe, and the evaporated working fluid is cooled to be condensed into a liquid state and then moves in a downward direction along gravity while the supplied heat is discharged to the outside after moving to the other side of the pipe. As described above, the working fluid in the heat pipe is repeatedly evaporated and condensed to transfer the heat in the high temperature part to the low temperature part, and since the heat pipe is basically influenced by the gravity, the liquid working fluid is always located at a lower part of the heat pipe, and the gaseous working fluid is always located at an upper part of the heat pipe. Accordingly, since an apparatus should be configured according to arrangement of the high temperature part and the low temperature part to use a conventional heat pipe, a configuration of an apparatus to which the heat pipe is applied is limited. Also known is Korean Laid-Open Patent No. 2002-0004319 (Jan. 16, 2002).

SUMMARY

The present invention is directed to providing a heat transferring device having a pumping structure configured so that a gaseous working fluid supplied through a heating part may pressurize a liquid working fluid in a cooling part. Further, the present invention is directed to providing a heat transferring device having a pumping structure configured so that a liquid working fluid in a cooling part may be located at a higher level than a heating part. In addition, the present invention is directed to providing a heat transferring device having a pumping structure configured so that a liquid working fluid in a cooling part may be recovered to a heating part while moving in a downward direction.

In addition, the present invention is directed to providing a heat transferring device having a pumping structure in which a cooling part is provided with a phase changing path configured to change a gaseous working fluid to a liquid state before the working fluid moves to a cooling path. In addition, the present invention is directed to providing a heat transferring device having a pumping structure capable of applying various heat sources to a heating part. In addition, the present invention is directed to providing a heat transferring device having a pumping structure to which a plurality of heat dissipation structures are applied.

One aspect of the present invention provides a heat transferring device having a pumping structure including a heating part configured to heat a liquid working fluid and change the liquid working fluid to a gas state, a cooling part configured to cool the gaseous working fluid supplied from the heating part and change the gaseous working fluid to a liquid state, a pressurizing part configured to allow the heating part and the cooling part to communicate with each other so that the gaseous working fluid pressurizes the liquid working fluid, and a recovery part configured to move the liquid working fluid supplied from the cooling part to the heating part.

Since a heat transferring device having a pumping structure of the present invention is configured so that a gaseous working fluid supplied through a heating part without a separate power source can pressurize a liquid working fluid of a cooling part, a configuration can be simplified, manufacturing costs of the heat transferring device are reduced, and further maintenance becomes easy. Further, since the liquid working fluid of the cooling part moves in an upward direction, an upper part can be used as a heat sink, and since the liquid working fluid is recovered while moving in a downward direction along gravity, circulation of the working fluid becomes smooth. In addition, since various heat sources can be applied to the heating part, usability of the heat transferring device is improved. In addition, a plurality of heat dissipation structures can be applied to increase a heat transfer amount, and an additional heat transferring part can be provided between the cooling part and a recovery part to additionally transfer heat using a lower temperature and low pressure working fluid, and accordingly, the heat transfer amount can efficiently increase.

DRAWINGS

DETAILED DESCRIPTION

Figure 1:
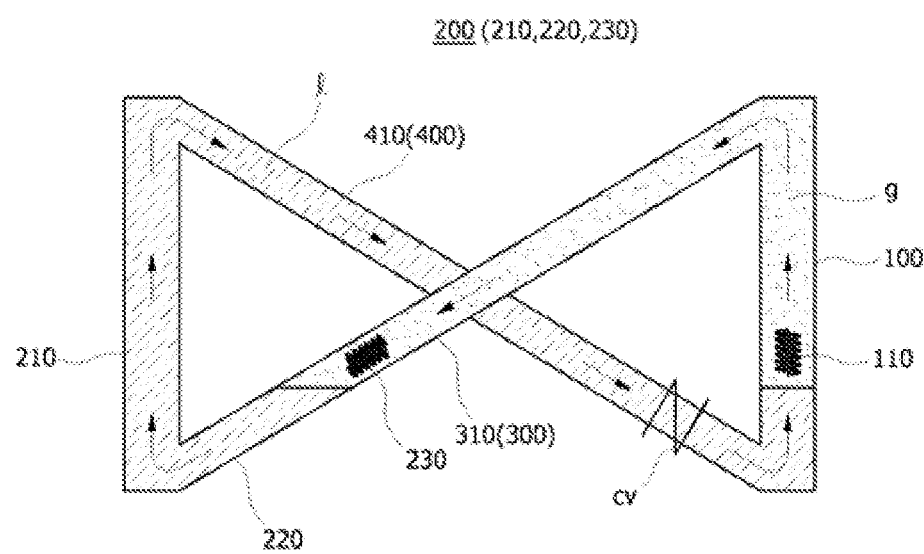
FIG. 1 is a view illustrating a basic structure of a heat transferring device according to the present invention.

Hereinafter, exemplary embodiments of the present invention will be described in detail with reference to the accompanying drawings which may allow one of ordinary skill in the art to easily perform the present invention. The present invention may be implemented in various forms and is not limited to the following embodiments. Components not related to the description are omitted in the drawings to clearly describe the present invention, and the same reference symbols are used for the same or similar components in the description.

It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof. Further, a case in which a part such as a layer, a film, an area, a plate, or the like is "on" another part includes not only a case in which the part is directly on another part but also a case in which another part is present between the part and the other part. Conversely, a case in which a part such as a layer, a film, an area, a plate, or the like is "under" another part includes not only a case in which the part is directly under another part but also a case in which still another part is present between the part and the other part.

Figure 2:
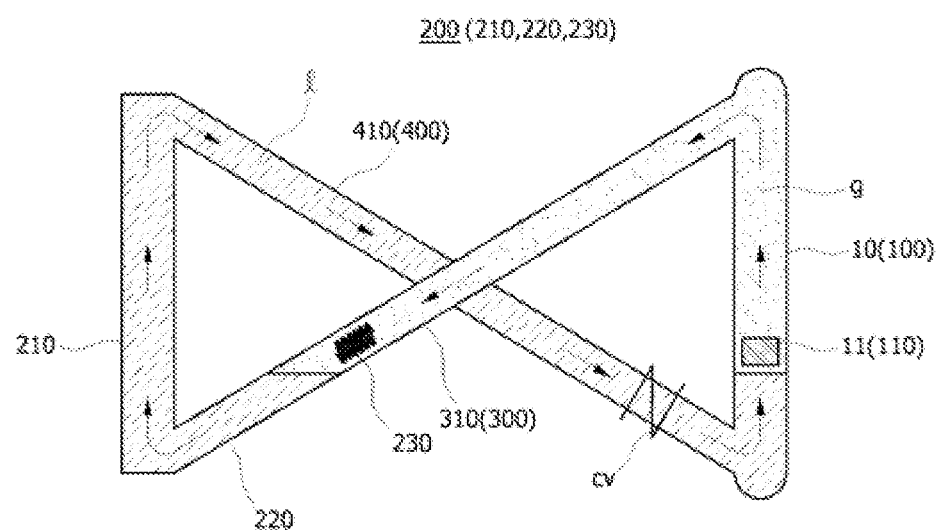
FIG. 2 is a view illustrating a state in which a pressure container of an atomic reactor is directly applied to the heat transferring device according to the present invention.
Figure 3:
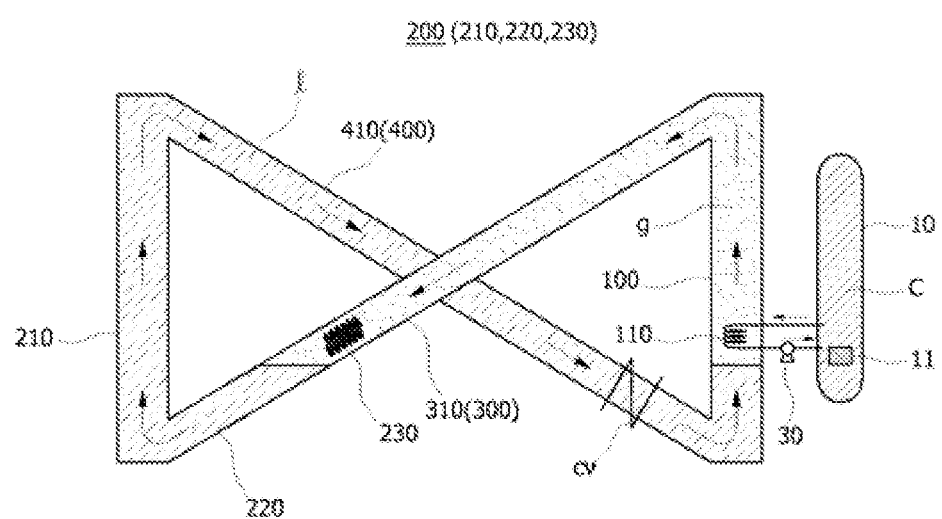
FIG. 3 is a view illustrating a structure of cooling the pressure container of the atomic reactor using the heat transferring device according to the present invention.
Figure 4:
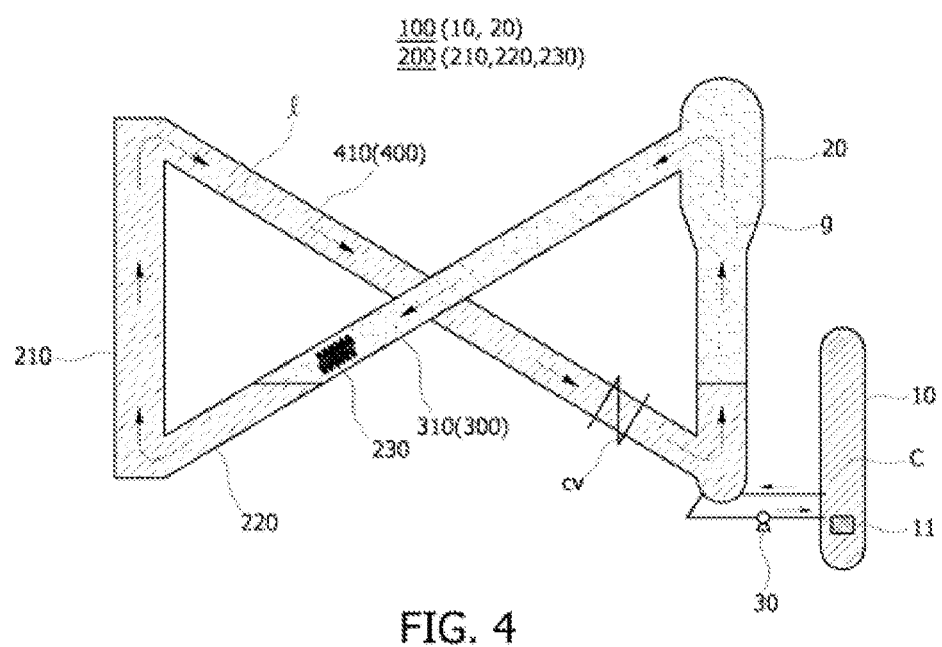
FIG. 4 is a view illustrating a state in which a steam generator is directly applied to the heat transferring device according to the present invention.
Figure 5:
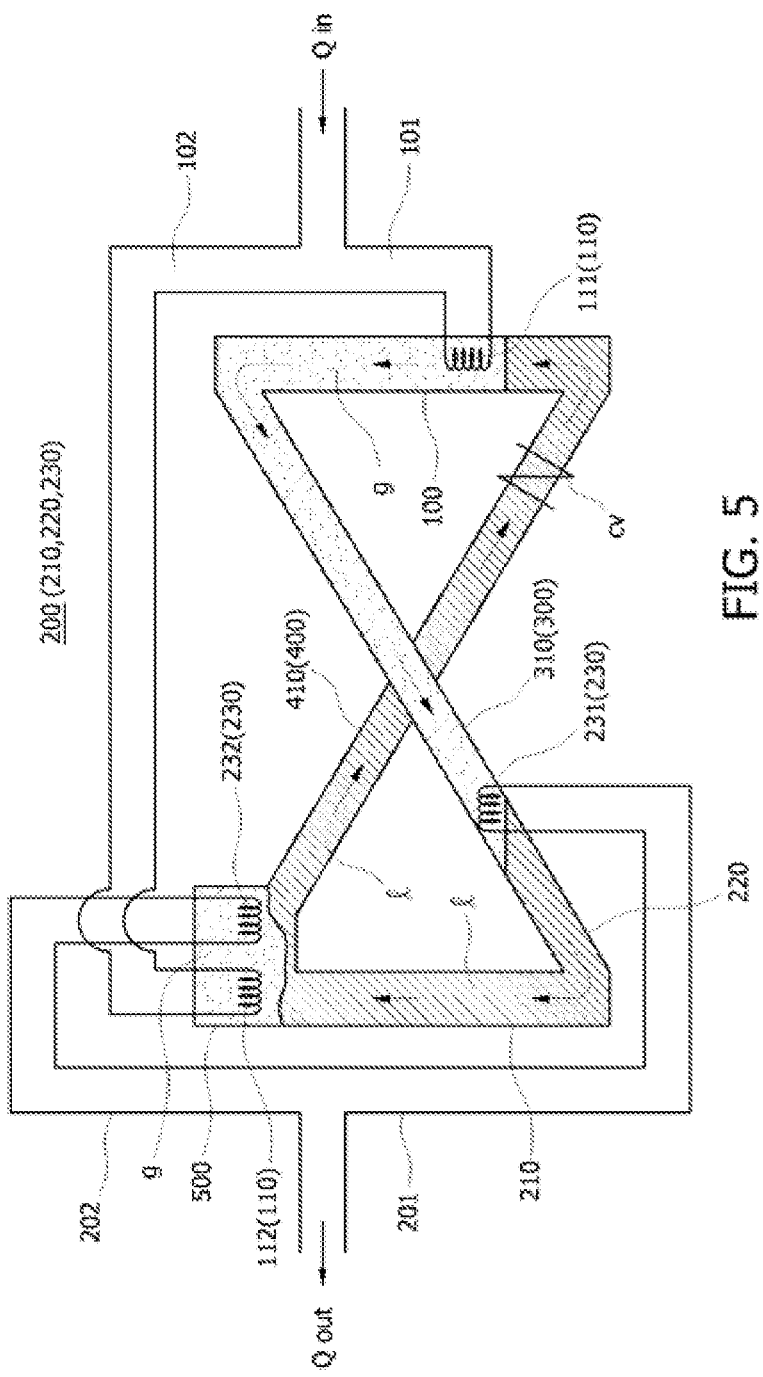
FIG. 5 is a view illustrating a heat transferring device according to another embodiment of the present invention.

FIG. 1 is a view illustrating a basic structure of a heat transferring device according to the present invention, FIG. 2 is a view illustrating a state in which a pressure container of an atomic reactor is directly applied to the heat transferring device according to the present invention, FIG. 3 is a view illustrating a structure of cooling the pressure container of the atomic reactor using the heat transferring device according to the present invention, FIG. 4 is a view illustrating a state in which a steam generator is directly applied to the heat transferring device according to the present invention, and FIG. 5 is a view illustrating a heat transferring device according to another embodiment of the present invention.

As shown in FIG. 1, the heat transferring device according to the present invention is provided with a heating part 100 configured to heat a working fluid in a liquid state l and change the working fluid in the liquid state l to a gas state g, and a cooling part 200 configured to cool the working fluid in the gas state g supplied from the heating part 100 and change the working fluid in the gas state g to the liquid state l. That is, the working fluid in the liquid state l located in the heating part 100 is phase-changed to the gas state g by heat supplied from the outside, and the working fluid in the gas state g, whose phase has been changed as described above, moves to the cooling part 200 and then is cooled through a process of dissipating heat to the outside to be phase-changed to the liquid state l, and accordingly, heat of the heating part 100 may be transferred to the cooling part 200.

A pressurizing part 300 configured to allow the heating part 100 and cooling part 200 to communicate with each other is provided, and the pressurizing part 300 is configured so that the working fluid in the gas state g directly pressurizes the working fluid in the liquid state l. Accordingly, since the pressurizing part 300 is configured so that the working fluid in the gas state g supplied through the heating part 100 without a separate power source may pressurize the working fluid in the liquid state l of the cooling part 200, a configuration may be simplified, manufacturing costs of the heat transferring device are reduced, and further maintenance becomes easy.

Further, a recovery part 400 is provided to move the working fluid in the liquid state l supplied from the cooling part 200 to the heating part 100. The pressurizing part 300 and the recovery part 400 will be described below in detail.

The above-described pressurizing part 300 is provided with a pressurizing path 310 so that the working fluid in the gas state g pressurizes the working fluid in the liquid state l, and as shown in FIG. 1, the pressurizing path 310 is formed to downwardly extend along a direction in which the fluid moves from the heating part 100 to the cooling part 200. That is, in the description on the basis of FIG. 1, the working fluid whose phase has been changed to the gas state g in the heating part 100 fills an upper part of the heating part 100 first. Further, when the working fluid in the gas state g is continuously supplied while the heating part 100 is constantly operated, the working fluid in the gas state g moves into the pressurizing path 310 of the pressurizing part 300 configured to allow the heating part 100 and cooling part 200 to communicate with each other. In this case, it is preferable that a certain amount of the working fluid in the liquid state l is accommodated in a lower part of the heating part 100 to prevent a backflow of the working fluid in the gas state g to the recovery part 400.

Further, the cooling part 200 is provided with a cooling path 210 through which the working fluid in the liquid state l moves, and since the cooling path 210 extends in an upward direction, the working fluid in the liquid state l is pressurized by the working fluid in the gas state g and may move in an upward direction. Specifically, when the heating part 100 is constantly operated, the working fluid in the gas state g moves to the pressurizing path 310 after filling the heating part 100, and the working fluid in the gas state g moves in a downward direction along the pressurizing path 310 configured to extend in a downward direction. Further, the phase of the working fluid is changed to the liquid state l in the cooling part 200, and the working fluid whose phase has been changed to the liquid state l as described above is pressurized by the working fluid in the gas state g continuously supplied through the pressurizing path 310 and moves in the upward direction through the cooling path 210 configured to extend in the upward direction. Accordingly, since the working fluid in the liquid state l may be pushed in the upward direction using a pressure of the working fluid in the gas state g, the working fluid in the liquid state l may be pumped without the separate power source, and accordingly, an upper part of the heat transferring device may be used as a heat sink.

The above-described recovery part 400 is provided with a recovery path 410 so that the working fluid in the liquid state l moves to the heating part 100, and since the recovery path 410 is formed to extend in a downward direction, the working fluid in the liquid state l is influenced by gravity while moving in a downward direction through the recovery path 410, and circulation of the working fluid becomes smooth due to the influence of gravity. That is, the working fluid in the liquid state l may be pumped to move in the upward direction using the pressure of the working fluid in the gas state g supplied through the heating part 100, and the working fluid in the liquid state l which moves upward may be influenced by gravity and move in the downward direction to be recovered in the heating part 100, and since the pressure of the working fluid and gravity are used as a driving force, the working fluid may smoothly circulate without a separate power source such as a pump. In this case, a check valve cv may be provided at a front end of the heating part 100. The check valve cv controls a flow of the working fluid to prevent a backflow of the working fluid in the liquid state l which moves to the heating part 100 through the recovery path 410 to the recovery path 410, and a general check valve cv configured to control the flow of the working fluid may also be used.

Further, the entire pressure of the working fluid supplied with the gas state g should be applied to the working fluid in the liquid state l to efficiently apply the pressure of the working fluid in the gas state g to the working fluid in the liquid state l. When the working fluid in the gas state g moves in an upward direction through the cooling path 210 without pressurizing the working fluid in the liquid state l, the pressure of the working fluid in the gas state g may not be efficiently applied. The cooling part 200 is provided with a phase changing path 220 so that the working fluid in the gas state g is completely changed to the liquid state l and moves in the upward direction through the cooling path 210 to prevent the above. The phase changing path 220 extends downward from the pressurizing path 310, and the cooling path 210 configured to extend upward is provided in an end of the phase changing path 220. That is, in the description according to a moving direction of the working fluid, the phase changing path 220 configured to extend downward is provided in an end of the pressurizing path 310 configured to extend in the downward direction, and the cooling path 210 configured to extend upward is provided in the end of the phase changing path 220. Accordingly, since the working fluid in the gas state g is phase-changed to the liquid state l in the phase changing path 220 and then fills the phase changing path 220 configured to extend downward due to gravity, upward movement of the working fluid in the gas state g through the cooling path 210 without the phase change may be prevented, and accordingly, the pressure of the working fluid in the gas state g is efficiently applied to the working fluid in the liquid state l. The cooling part 200 further includes a cooling member 230 configured to cool the working fluid in the gas state g, and the cooling member 230 is disposed in the phase changing path 220 so that the working fluid in the gas state g supplied through the pressurizing path 310 is phase-changed to the working fluid in the liquid state l.

Further, as shown in FIG. 1, the heating part 100 is provided with a heating member 110 configured to change the working fluid in the liquid state l to the gas state g. Various heat sources may be applied to the heating part 100 in the present invention, and as the heating part 100, as shown in FIG. 2, a reactor core 11 disposed in a pressure container 10 of an atomic reactor may be used. That is, the working fluid in the liquid state l accommodated in the heating part 100 is changed to the gas state g using high temperature heat generated from the reactor core 11.

Generally, a cooling material c is accommodated in the pressure container 10 of the atomic reactor to transfer the high temperature heat generated from the reactor core 11 to the outside, and a circulation pump 30 is provided so that the cooling material c circulates through the pressure container 10 and the outside, and as shown in FIG. 3, a heat exchanger in which the cooling material c in the pressure container 10 circulates may be used as the heating part 100. Alternatively, as shown in FIG. 4, a steam generator 20 provided at the atomic reactor may be used as the heating part 100, and the circulation pump 30 is provided so that the cooling material c provided in the pressure container 10 of the atomic reactor passes through the steam generator 20 to use a high temperature cooling material c as the heat source of the heating part 100. Accordingly, since various heat sources may be applied to the heating part 100, usability of the heat transferring device is improved.

Further, as shown in FIG. 5, an additional heat transferring part 500 may be provide to increase a heat transfer amount. That is, a state of the working fluid is changed from a liquid state to a gas state in the heating part 100 through a first heating member 111, the gaseous working fluid is changed to the liquid state through a first cooling member 231 in the cooling part 200 to basically transfer heat, and the additional heat transferring part 500 is provided so that additional heat may be transferred. When a plurality of heat dissipation structures are applied, the heat transfer amount may efficiently increase.

The additional heat transferring part 500 may be provided between the cooling part 200 and the recovery part 400 to use a low pressure and low temperature working fluid which moves between the cooling part 200 and the recovery part 400, and the working fluid which moves in the upward direction along the cooling part 200 becomes a low pressure state due to gradual pressure reduction, and since a low temperature and low pressure refrigerant is easily phase-changed, the heat transfer amount may efficiently increase when the heat is transferred using latent heat through the phase change. An additional heating member 112 configured to change the low pressure and lower temperature working fluid to the gas state and an additional cooling member 232 configured to change the working fluid changed to the gas state through the additional heating member 112 to the liquid state are provided in the additional heat transferring part 500. In the additional heat transferring part 500, since heat is transferred while changing the working fluid to the gas state such as steam through the additional heating member 112 (Steam Jet) and heat is transferred while changing the gaseous working fluid, which is like steam, to the liquid state through the additional cooling member 232 (water spray), the heat transfer amount efficiently increases. Further, as shown in FIG. 5, a first heating path 101 and a second heating path 102 configured to connect the first heating member 111 and the additional heating member 112 with a heat source Qin may be provided, and a first heat dissipation path 201 and a second heat dissipation path 202 configured to connect the first cooling member 231 and the additional cooling member 232 to a heat dissipation part Qout may be provided.

Although embodiments of the present invention are described above, the spirit of the present invention is not limited to the embodiments shown in the description, and although those skilled in the art may provide other embodiments due to additions, changes, or deletion of the components within the scope of the same spirit of the present invention, such embodiments and the above embodiments are also included in the scope of the spirit of the present invention.

REFERENCE NUMERALS

10: pressure container
11: reactor core
20: steam generator
30: circulation pump
100: heating part
101: first heating path
102: second heating path
110: heating member
111: first heating member
112: additional heating member
200: cooling part
201: first heat dissipation path
202: second heat dissipation path
210: cooling path
220: phase changing path
230: cooling member
231: first cooling member
232: additional cooling member
300: pressurizing part
310: pressurizing path
400: recovery part 410: recovery path
500: additional heat transferring
partc: cooling material
g: gas state
l: liquid state
cv: check valve

The invention claimed is:

1. A heat transferring device comprising:
a heater configured to heat a working fluid that is in a liquid state and change the working fluid from the liquid state to a gaseous state;
a cooler configured to cool a portion of the working fluid supplied from the heater and change the portion of the working fluid from the gaseous state back to the liquid state;
a first working fluid path configured to allow the heater to communicate with the cooler so that the working fluid that is in the gaseous state is supplied from the heater to the cooler via the first working fluid path, wherein the working fluid moves in a downward direction in the first working fluid path; and
a recoverer configured to enable the portion of the working fluid that is changed back to the liquid state to move from the cooler to the heater,
wherein the cooler includes,
a phase changing path configured to be inclined and extend downward from the first working fluid path, wherein the portion of the working fluid supplied from the heater is changed from the gaseous state back to the liquid state in the phase changing path, and
a cooling path connected to the phase changing path and configured to move the portion of the working fluid changed back to the liquid state in the phase changing path in an upward direction therethrough such that the portion of the working fluid moves from the phase changing path to the cooling path and then moves upward in a direction opposite to the direction of gravity along the cooling path, while being pressurized by a remaining portion of the working fluid in the gaseous state from the heater, and
wherein a recovery path is provided in the recoverer, and one end of the recovery path connects to the cooling path at an upper-most end of the cooling path, an opposite end of the recovery path is connected to a bottom end of the heater, the recovery path includes a downwardly inclined portion extending from the one end, and the portion of the working fluid moves from the cooler to the heater while moving in a downward direction via gravity.

2. The heat transferring device of claim 1, further comprising:
an additional heat transfer path connecting the upper-most end of the cooling path to the one end of the recovery path and including another cooler, the another cooler configured to cool the portion of the working fluid that has passed through the cooling path.

3. The heat transferring device of claim 2, wherein the additional heat transfer path further includes another heater, the another heater being upstream of the another cooler, the another heater configured to change the portion of the working fluid received through the cooling path from the liquid state to the gaseous state.

4. The heat transferring device of claim 2, wherein:
the heater includes a reactor core provided in a pressure container of an atomic reactor.

5. The heat transferring device of claim 2, wherein:
the heater includes a pressure container of an atomic reactor and a steam generator, through which a cooling material provided in the pressure container passes to generate steam; and
the working fluid changed by the heater from the liquid state to the gaseous state includes the steam generated from the steam generator.

6. The heat transferring device of claim 1, further comprising:
an additional heat transfer path between the cooler and the recoverer and configured to change the portion of the working fluid that has passed through the cooler from the liquid state to the gaseous state and back to the liquid state to transfer heat.

7. The heat transferring device of claim 6, wherein the additional heat transfer path includes an additional heater configured to change the portion of the working fluid supplied from the cooler from the liquid state to the gaseous state and an additional cooler configured to change the portion of the working fluid changed to the gaseous state by the additional heater back to the liquid state.

* * * * *